(12) United States Patent
Watanabe

(10) Patent No.: US 8,284,413 B2
(45) Date of Patent: Oct. 9, 2012

(54) INFORMATION PROCESSING APPARATUS AND PROGRAM

(75) Inventor: Kenichi Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 953 days.

(21) Appl. No.: 12/007,837

(22) Filed: Jan. 16, 2008

(65) Prior Publication Data

US 2008/0170270 A1    Jul. 17, 2008

(30) Foreign Application Priority Data

Jan. 16, 2007  (JP) ................................. 2007-007237

(51) Int. Cl.
G06F 15/00 (2006.01)
G06F 3/12 (2006.01)
G06K 1/00 (2006.01)

(52) U.S. Cl. ..................................... 358/1.13; 358/1.15
(58) Field of Classification Search .................. 358/1.13, 358/1.15, 1.14, 1.1
See application file for complete search history.

(56) References Cited

U.S. PATENT DOCUMENTS

| | | | |
|---|---|---|---|
| 5,694,222 A | 12/1997 | Yamada | |
| 5,990,891 A | 11/1999 | Fukaya | |
| 7,809,297 B2 * | 10/2010 | Moroi | ............................ 399/80 |
| 2005/0018236 A1 | 1/2005 | Shirai et al. | |
| 2006/0087680 A1 | 4/2006 | Maeda | |
| 2006/0274347 A1 * | 12/2006 | Mori | ........................... 358/1.13 |
| 2008/0007758 A1 * | 1/2008 | Miyashita | .................... 358/1.14 |

FOREIGN PATENT DOCUMENTS

| | | |
|---|---|---|
| JP | 8-130654 | 5/1996 |
| JP | H10-154055 A | 6/1998 |
| JP | 2005-044080 A | 2/2005 |
| JP | 2005-301613 | 10/2005 |
| JP | 2006-120041 A | 5/2006 |

OTHER PUBLICATIONS

Japan Patent Office, Notification of Reason for Refusal for Japanese Patent Application No. 2007-007237 (counterpart to above-captioned patent application), dispatched Aug. 16, 2011.

* cited by examiner

*Primary Examiner* — Douglas Q Tran
(74) *Attorney, Agent, or Firm* — Baker Botts L.L.P.

(57) ABSTRACT

An information processing apparatus, comprising: an output unit for outputting output information to a user; a receiving unit for receiving function-restricting information showing whether a printer is in a function-restricted status, from the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side; and a controller for controlling so as to always output via the output unit the output information showing whether the printer is in the function-restricted status, based on the function restricting information received by the receiving unit.

8 Claims, 9 Drawing Sheets

| ICON | IMAGE | COLOR OF BACKGROUND | MEANING OF DISPLAY |
|---|---|---|---|
| #1 | ONLY PRINTER | GREEN | NORMAL |
| #2 | ONLY PRINTER | YELLOW | WARNING |
| #3 | ONLY PRINTER | RED | ERROR |
| #4 | PRINTER+LOCK | GREEN | FUNCTION RESTRICTION 1 |
| #5 | ONLY PRINTER | LIGHT GRAY | FUNCTION RESTRICTION 2 |
| #6 | ONLY PRINTER | DARK GRAY | FUNCTION RESTRICTION 3 |

FIG. 2
| | ICON | IMAGE | COLOR OF BACKGROUND | MEANING OF DISPLAY |
|---|---|---|---|---|
| #1 | 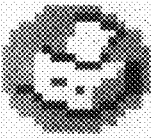 | ONLY PRINTER | GREEN | NORMAL |
| #2 |  | ONLY PRINTER | YELLOW | WARNING |
| #3 |  | ONLY PRINTER | RED | ERROR |
| #4 |  | PRINTER+LOCK | GREEN | FUNCTION RESTRICTION 1 |
| #5 |  | ONLY PRINTER | LIGHT GRAY | FUNCTION RESTRICTION 2 |
| #6 |  | ONLY PRINTER | DARK GRAY | FUNCTION RESTRICTION 3 |

INFORMATION PROCESSING APPARATUS AND PROGRAM

CROSS REFERENCE TO RELATED APPLICATION

The present application claims priority from Japanese Patent Application No. 2007-007237, which was filed on Jan. 16, 2007, the disclosure of which is herein incorporated by reference in its entirety.

TECHNICAL FIELD

The present invention relates to an information processing apparatus for outputting information in regard to a printer and to programs thereof.

BACKGROUND

Conventionally, a printer the functions of which can be restricted has already been proposed (For example, refer to Patent Document 1). This type of printer is constructed so that parts of functions of all functions included in the printer may be restricted by setting at the printer side.

For example, in the case of the printer described in Patent Document 1, with respect to respective functions of a black monochrome printing function, a monochrome printing function other than black and a full-color printing function, it is possible to optionally set whether each of the functions is utilized or restricted, at the printer side.

A remote print mode by which a printer is operated based on a print command from an information processing apparatus located outside the printer is disclosed in the same document. In the case of the remote print mode, for example, even if the full-color printing function is restricted, the function restriction can be cancelled by transmitting a password from the information processing apparatus side to the printer side (Refer to Patent Document 1, Paragraphs [0070] and [0071]). Patent Document 1: Japanese Published Unexamined Patent Application No. H8-130654

SUMMARY

However, there is such a problem that, when printing is carried out in the remote print mode, it cannot be noticed whether the function is restricted at the printer side unless a print command is actually issued from the information processing apparatus side to the printer side.

In the above-described printer, when input of a password is actually requested according to the result of command for printing from the information processing apparatus side to the printer side, a user can notice at this moment that the function is restricted at the printer side.

For this reason, in an environment in which a printer the functions of which are restricted and a printer the functions of which are not restricted exist in a mixed state, a user, who does not know which printer is restricted for the functions, cannot know which printer is restricted for the functions unless the user commands printing to the printer.

Therefore, there is another problem in that, for a user who intends to select a printer the functions of which are not restricted or a user who intends to forgo printing if a predetermined printer is restricted for the functions thereof, it is troublesome.

Also, at the information processing apparatus side, there may be cases where a user handles such operations as temporary modification of print setting when carrying out printing and modification of default printing setting of the printer driver. There is a possibility for a user to carry out setting to utilize a predetermined function even if the function is restricted, unless the user notices that the above-described function is restricted at the printer side.

In such a case, it becomes troublesome that an error occurs at the moment when printing is commanded after print setting is modified, and if a user notices that the initial setting is not performed, print setting is reset and a user searches for another printer. Further, there is a case that a user, who does not notice that the function of printer is restricted at the printer side, misunderstands that there is something wrong with the print setting at the information processing apparatus side.

The present invention was developed to solve the above-described problems, and it is therefore an object of the present invention to provide an information processing apparatus that is constructed so that, where a specified function restriction is given to a printer by setting at the printer side, a user can easily recognize this, and to provide a program to configure such an information processing apparatus.

Hereinafter a description is given of a configuration adopted in the present invention.

First, an information processing apparatus according to one of the aspects of the invention is characterized in that the information processing apparatus includes: an output unit for outputting output information to a user; a receiving unit for receiving function-restricting information showing whether a printer is in a function-restricted status, from the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side; and a controller for executing control so as to always output via the output unit the output information showing whether the printer is in the function-restricted status, based on the function restricting information received by the receiving unit.

According to the information processing apparatus thus configured, a user of the information processing apparatus can recognize in advance whether a printer is in a function-restricted status, based on the output information that is always outputted, without actually attempting to command printing. Therefore, it is possible to judge whether desired printing is enabled without any troublesome work, wherein it is possible to prevent an unnecessary print command from being given to the printer regardless of the impossibility of desired printing.

BRIEF DESCRIPTION OF THE DRAWINGS

Illustrative aspects of the invention will be described in detail with reference to the following figures wherein:

FIG. 2 is a schematic view of an icon that is displayed by a status monitor in Embodiment 1;

DETAILED DESCRIPTION OF THE PREFERRED EMBODIMENTS

Next, a description is given of embodiments of the present invention based on specific examples.

(1) Embodiment 1

First, a description is given of Embodiment 1.
(Configuration of the Entire System)

Figure 1:
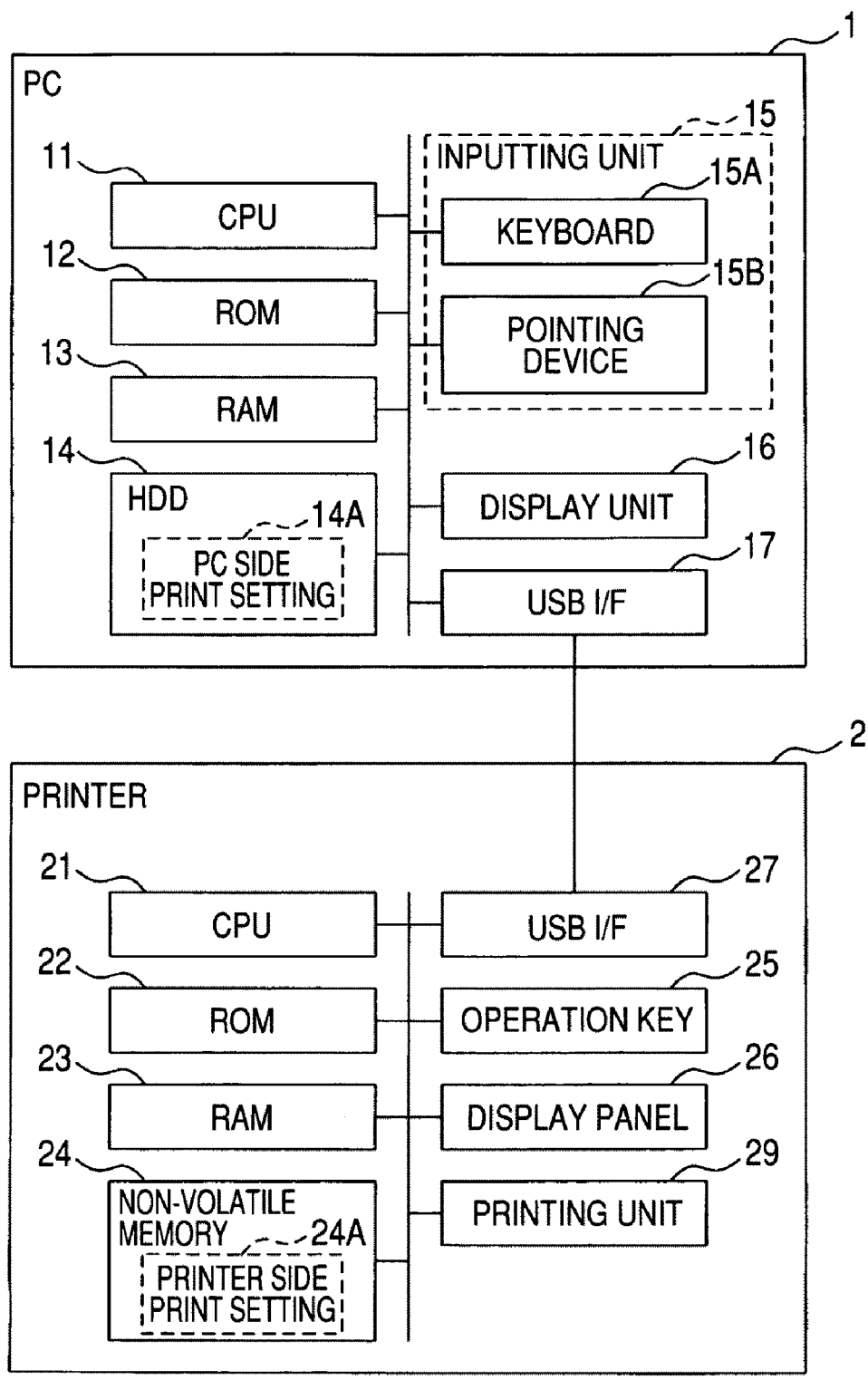
FIG. 1 is a block diagram showing the entire configuration of a system equipped with a PC and a printer according to Embodiment 1.

FIG. 1 is a schematic view showing the entire configuration of a system equipped with a personal computer 1 (herein after referred to as a PC 1) and a printer 2. Of these, the PC 1 corresponds to one example of an information processing apparatus referred to in the present invention, and the printer 2 corresponds to one example of a printer referred to in the present invention.

The PC 1 is provided, as shown in FIG. 1, with a CPU 11, a ROM 12, a RAM 13, a hard disk device 14 (herein after referred to as a HDD 14), an inputting unit 15, a display 16, and a USB interface 17 (herein after referred to as a USB I/F 17), etc. Of these, the display 16 corresponds to one example of the output unit or display unit referred to in the present invention.

In the present embodiment, a PC side print setting 14A (equivalent to one example of the first print setting) described later is housed in the HDD 14. Also, in the present embodiment, the PC 1 is provided with a keyboard 15A and a pointing device 15B as the inputting unit 15.

A specific example of the pointing device 15B, for example, a mouse, a touch pad, a pointing stick, a pen tablet, a touch panel, etc., may be mentioned. In the present embodiment, any one of these may be optionally adopted.

In addition, an operating system (OS) equipped with multi-task functions is incorporated in the PC 1, and a plurality of tasks are caused to function in parallel under control of the OS. For example, Windows (Registered Trademark) may be mentioned as a specific example of an OS that includes these types of multi-task functions. Since the functions themselves of such a type of OS have been publicly known, a detailed description thereof is omitted here. However, herein after, a description is given under the assumption that the PC 1 incorporates Windows (Registered Trademark).

The printer 2 is provided with a CPU 21, a ROM 22, a RAM 23, a non-volatile memory 24, operation keys 25, a display panel 26, a USB interface 27 (herein after referred to as a USB I/F 27), and a printing unit 29. In the present embodiment, a printer side print setting 24A (equivalent to the second print setting referred to in the present invention) described later is incorporated in the non-volatile memory 24.

The PC 1 and the printer 2 are connected to each other via USB I/Fs 17 and 27, wherein bi-directional communications are available between the PC 1 and the printer 2. In detail, various types of control commands such as, for example, a print command are transmitted from the PC 1 side to the printer 2 side, and various types of information regarding the printer 2 are transmitted from the printer 2 side to the PC 1 side. (PC side print setting and Printer side print setting)

Next, a description is given of the PC side print setting 14A and the printer side print setting 24A.

In the present embodiment, PC 1 transmits print commands subject to the PC side print setting 14A, which exists at the PC 1 side, to the printer 2. A description is given below based on a specific example. For example, where setting for a full-color printing is given in the PC 1 side setting 14A, the PC 1 commands full-color printing to the printer 2. Also, for example, where setting for monochrome printing is given in the PC 1 side print setting 14A, the PC 1 commands monochrome printing to the printer 2.

With respect to various types of settings such as printing quality including resolution, layout including [2in1], paper size, etc., other than the setting of full-color printing and monochrome printing, the PC 1 transmits print commands subject to the PC side print setting 14A to the printer 2.

Also, in FIG. 1, only a status where the PC side print setting 14A is housed in the HDD 14 is illustrated. However, the PC side print setting 14A is read from the HDD 14 when starting the PC 1 or when starting the printer driver, and is housed in the RAM 13. And, the printer driver transmits print commands, which are subject to the setting housed in the RAM 13, to the printer 2.

The contents of the PC side print setting 14A read from the HDD 14 are the default values of the PC side print setting 14A, and may be partially or wholly modified optionally by a user after the contents are housed in the RAM 13. Further, the contents modified in the RAM 13 may be stored in the HDD 14 as the default values of new PC side print setting 14A.

Setting modification of the PC side print setting 14A as described above may be executed immediately before actually executing printing, and the PC side print setting 14A may be modified regardless of whether printing is actually executed.

On the other hand, the printer 2 usually executes printing in compliance with print command from the PC 1 side as long as there is no particular restriction. However, in a case where such a setting is made available by which a part of the functions of the printer side print setting 24A is restricted, the printer executes printing without utilizing the restricted function.

Also, a description is given below thereof based on a specific example. For example, where setting is made available by which full-color printing is restricted in the printer side print setting 24A, the printer 2 does not execute any full-color printing even if full-color printing is instructed by the PC 1 side, but executes mono chrome printing. Also, where a setting is not made available by which full-color printing is restricted in the printer side print setting 24A, the printer 2 executes full-color printing if full-color printing is commanded from the PC 1 side.

With respect to the functions other than the full-color printing function, if restriction is set in the printer side print setting 24A, the printer 2 executes printing in compliance with the printer side print setting 24A in regard to the corresponding function without being subjected to commands from the PC 1 side.
(Outline of Status Monitor)

Next, a description is given of the outline of the status monitor functioning on the PC 1.

The status monitor is based on software that always outputs the status of the printer 2, which is acquired from the printer 2, to the display 16. Also, in the present embodiment, the status monitor is constructed so as to always output information regarding the function restriction optionally set in the printer side print setting 24A in addition to the status of the printer 2.

The status monitor according to the present embodiment may start or end independently from application software that becomes the source of transmitting print commands, and the status monitor is started when starting the PC 1. Also, the status monitor is caused to function as a residing process. Where the status monitor is caused to function as the residing process, it always resides on the PC 1 and continues processing.

As shown in FIG. 2, the statuses of the printer 2, which are displayed by the status monitor, are displayed by six types of icons #1 through #6 (equivalent to one example of output information or a display object that is referred to in the present invention).

These icons #1 through #6 are composed of combinations consisting of two types of images and five types of background portions having different colors. Six types of statuses, which are "Normal," "Warning," "Error," "Function Restriction 1," "Function Restriction 2," and "Function Restriction 3," are displayed by the combinations.

The "Normal," "Warning," and "Error" of these statuses are also information displayed in a conventional status monitor. Also, "Warning" and "Error" notify a user that the status of the printer is brought into difficulty in printing execution such as shortage of ink, shortage of sheets, print busy, and shortage of memory.

On the other hand, the "Function Restriction 1," "Function Restriction 2," and "Function Restriction 3" are information set in the printer side print setting 24A, wherein the status of the printer 2 itself is not brought into difficulty in printing execution. Such function restrictions are not displayed in any conventional status monitor.

Figure 3A:
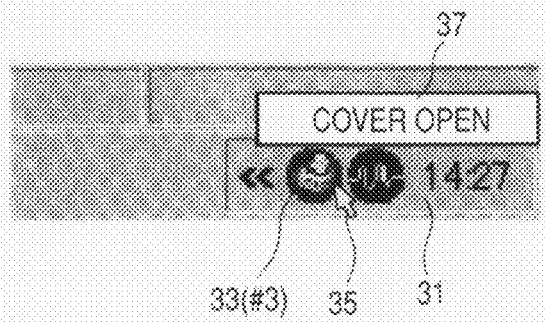
FIGS. 3A, 3B and 3C are schematic views showing a display pattern of icons and messages by the status monitor in Embodiment 1.
Figure 3B:
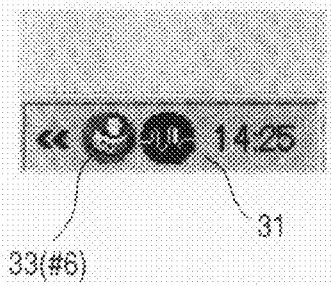
Figure 3C:
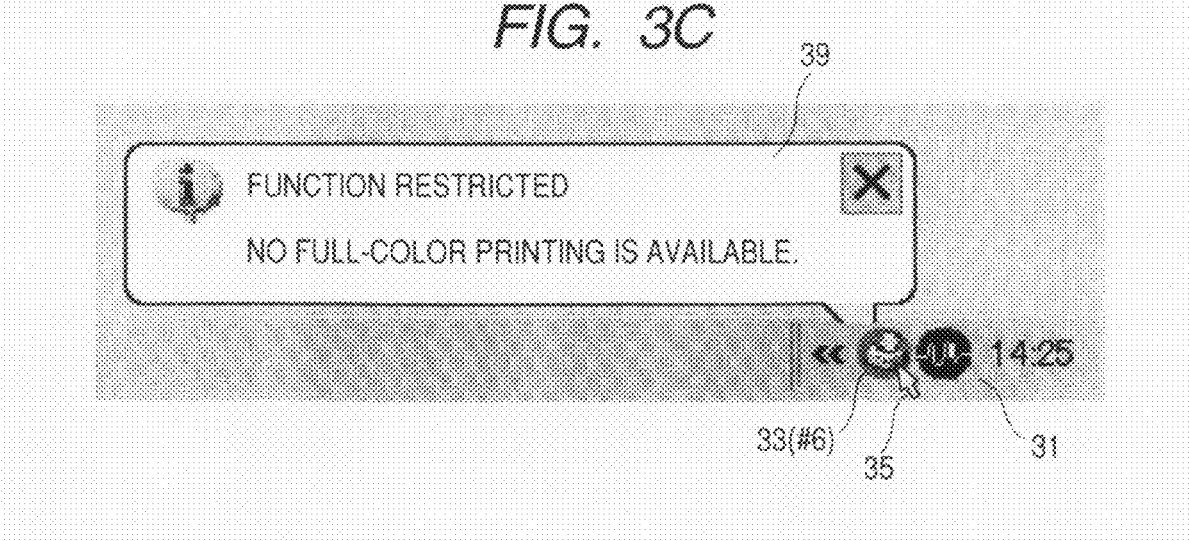

Further, in the case of the present embodiment, as shown in FIG. 3A to 3C, the status monitor displays icon 33 in the notification area 31, which is one of the display areas managed by the OS. Any one of the above-described icons #1 through #6 is displayed as the icon 33 in compliance with the status of the printer 2.

For example, FIG. 3A shows that icon #3 is displayed since the status of the printer 2 is "Error." Where the status of the printer 2 is "Error," if a user operates the pointing device 15B and points the icon 33 by a pointer 35, a pop-up message 37 is displayed. Therefore, the user may know further detailed information (in the case of FIG. 3A, "COVER OPEN").

Also, FIG. 3B shows that the printer 2 is in a status where full-color printing is restricted. Therefore, icon #6 is displayed. Where the status of the printer 2 is "Function Restriction," if a user carries out a predetermined operation by the pointing device 15B after the user operates the pointing device 15B and points the icon 33 by the pointer 35, a balloon message 39 is displayed.

Accordingly, the user may know further detailed information (in the case of FIG. 3C, full-color printing is not available because of function restriction). In this connection, the predetermined operation carried out by the pointing device 15B in order to display the balloon message 39 is a so-called "Click operation" in the case of the present embodiment.

If the pointing device 15B is a mouse, the "Click operation" is an operation of pressing down the button equipped in the mouse once. However, an operation other than the button operation may become the "Click operation," depending on a specific configuration of the pointing device 15B. For example, if the pointing device 15B is a touch pad, "a tapping operation" (tapping on the touch panel with a finger tip) becomes an operation corresponding to the "Click operation" referred to herein.

Also, in the above description, it is described that the "Click operation" is carried out after pointing is completed. However, a "Double click operation" may be carried out after the pointing, instead thereof. In addition, it may be displayed that the message is displayed only by pointing.

Further, in the above description, an example in which the icon 33 is displayed in the notification area 31 is illustrated. However, the icon 33 may be displayed in a display area having a different pattern from that of the notification area 31. That is, although the notification area 31 is one of the display areas subjected to the specification of the OS incorporated in the PC 1, the status monitor may independently secure a display area (for example, a window inherent to the status monitor) on the display 16, and the icon 33 may be displayed in the display area.

(Process on Starting the Status Monitor)

Figure 4:
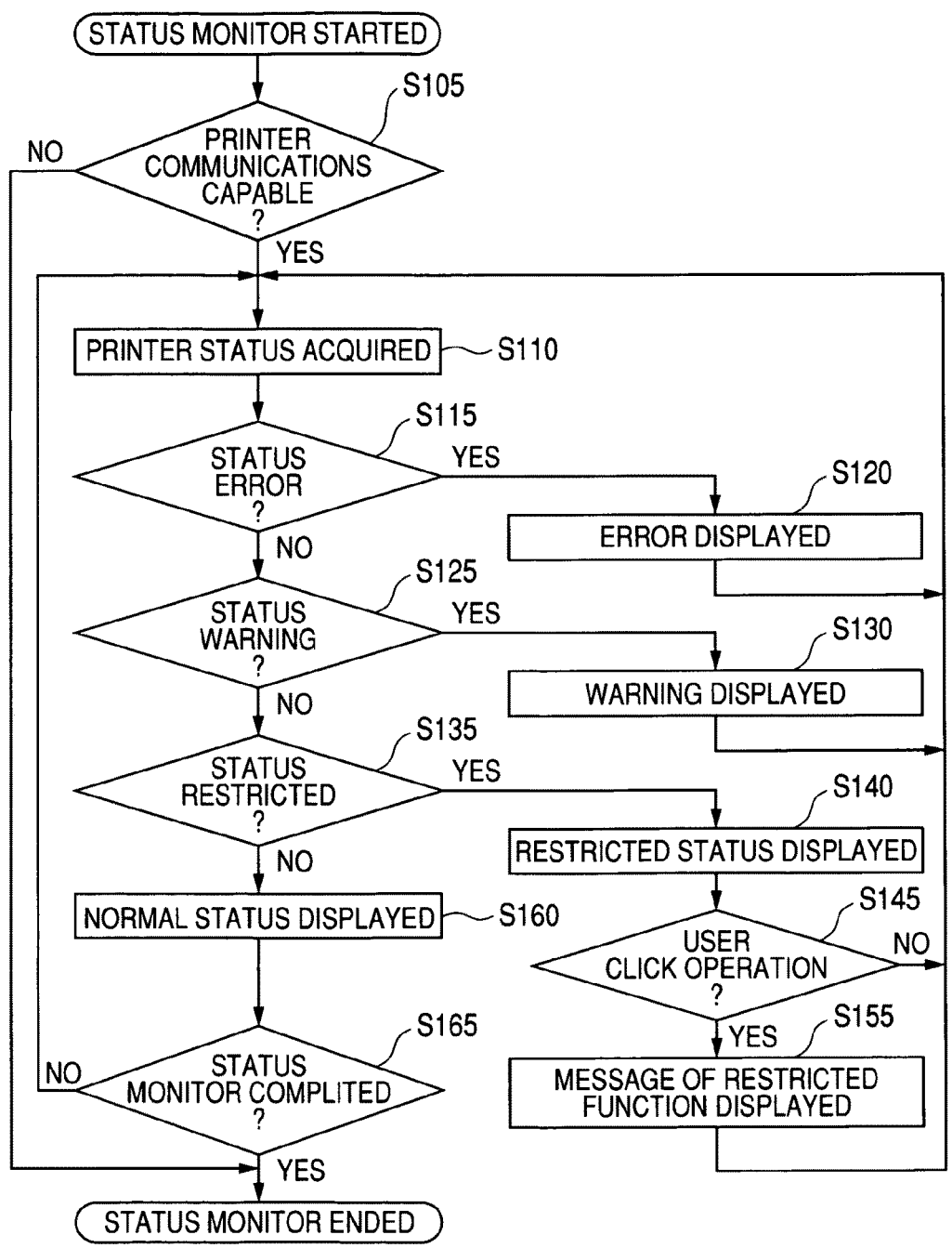
FIG. 4 is a flowchart of a process executed in the PC when starting of the status monitor is commanded in Embodiment 1.

Next, based on a flowchart of FIG. 4, a description is given of a process that is executed on the PC 1 when starting of the status monitor is commanded.

As the process is commenced, the PC 1 first judges whether it is able to communicate with the printer 2 (S105). Here, if it is not able to communicate with the printer 2 (S105: NO), the present process is terminated as it is. On the other hand, if it is able to communicate with the printer 2 in the process of S105 (S105: YES), the PC 1 acquires a printer status from the printer 2 (S110), and judges whether the acquired status is "error" (S115).

If the status is "Error" (S115: YES), the PC 1 displays the status of error (S120). By the process of S120, the icon 33 displayed in the notification area 31 (Refer to FIG. 3) becomes icon #3 (Refer to FIG. 2). After the process of S120 is completed, the process is returned to the process of S110. On the other hand, if the status is not "Error" (S115: NO), the PC 1 judges whether the acquired status is "Warning" (S125).

Where the status is "Warning" (S125: YES), the PC 1 displays the status of "Warning" (S130). By the process of S130, the icon 33 displayed in the notification area 31 becomes icon #2 (Refer to FIG. 2). After the process of S130 is completed, the process is returned to the process of S110. On the other hand, if the status is not "Warning" (S125: NO), the PC 1 judges whether the acquired status is "Function Restriction" (S135).

If the status is "Function Restriction" (S135: YES), the PC 1 displays the function-restricted status (S140). By the process of S140, the icon 33 displayed in the notification area 31 is any one of the icons #4 to #6 (Refer to FIG. 2).

Furthermore, in the process of S140, which icon is displayed is judged based on a flag of the acquired status, and for example, in the case where the full-color printing function is restricted, the icon #6 is selected, that is, the icon corresponding to the restricted function is selected.

After the process of S140 is completed, the PC 1 continuously judges whether a user carries out a click operation (S145).

Where the Click Operation is Carried Out (S145: Yes), the PC 1 displays a message conveying a function restriction (S155), and the process is returned to the process of S110. As a result, the balloon message 39 (Refer to FIG. 3(*c*)) is displayed in the display 16. If the click operation is not carried out, the process is returned to the process of S110 as it is.

Also, if the status is not during function restriction in the process of S135 (S135: NO), the PC 1 displays a normal status (S165). By the process of S165, the icon 33 displayed in the notification area 31 is icon #1 (Refer to FIG. 2).

Further, after the process of S165 is completed, the PC 1 judges whether the status monitor is terminated (S165). Where it is judged that the status monitor is not terminated (S165: YES), the process is returned to S110.

In addition, in the case where the process is returned to the process of S110 in the processes described above, the processes subsequent to S110 are respectively repeated. Also, where it is judged that the status monitor is terminated (S165: YES), the present process is terminated.

Effects of Embodiment 1

As described above, according to the PC 1 described above, a user of the PC 1 may recognize in advance whether the printer 2 is in a function-restricted status, by the icon 33 which is usually outputted, without actually carrying out printing. Therefore, it is possible for the user to easily judge, without any trouble, whether desired printing is enabled. It is possible to prevent a useless print command from being given to the printer 2 although desired printing is not possible.

Further, although a print instruction system process such as a printer driver that is called from word processing software are started when a user of the PC 1 executes printing by the printer 2, the status monitor may be started independently from such a print instruction system process.

Therefore, if the status monitor is started as a residing process independently from the print instruction system process, the user may judge it in advance whether desired printing is enabled, without starting the print instruction system process.

If the user is accustomed to checking it by output of the status monitor whether the status of the printer 2 is normal or in error, the user may know, when checking it, that the printer 2 is in a function-restricted status.

That is, even with a conventional status monitor, it was possible to display whether the status of the printer 2 is normal or in error. Therefore, if exclusive software to notify only that the printer 2 is in a function-restricted status is concurrently adopted in a status where such a conventional status monitor is used, it is possible to check that the printer 2 is in a function-restricted status.

However, in this case, if the conventional status monitor and the exclusive software use the notification area 31, respectively, the notification area 31 is unnecessarily consumed, and a possibility of overlooking one of the notices is increased.

In this connection, since in the above-described PC 1 the status monitor displays whether the status of the printer 2 is normal or in error, and furthermore displays that the printer is in a function-restricted status, the utilization efficiency of the notification area 31 is increased. Also, if the user is accustomed to checking the output of the status monitor, a possibility of overlooking the notice of the function-restricted status is lowered.

Further, since the PC 1 displays whether the printer 2 is in a function-restricted status based on a difference in pattern and color of the icon 33 displayed in the display 16, a user may intuitively recognize it at a glance whether the printer 2 is in a function-restricted status.

Still further, since the PC 1 displays information showing the details of the function-restricted status in compliance with an instruction from the user by the processes S145 and S155 described above, the user who needs the details of the function-restricted status may know the detailed information only by giving the instruction. On the other hand, for the user who does not need the details of the function-restricted status, no troublesome information is displayed unless the instruction is given. Therefore, it is possible to provide information to the degree of the user's needs.

(2) Embodiment 2

Next, a description is given of Embodiment 2. Also, since there are many common parts while Embodiment 2 and Embodiment 3 are different in a part of configuration from Embodiment 1 described above, a detailed description is given of points differing from Embodiment 1, and a detailed description of the common parts is omitted.

In Embodiment 1 described above, the status monitor displays an example of notifying that the printer 2 is in a function-restricted status. However, in Embodiment 2, the status monitor displays an example of notifying that the printer 2 is in a function-restricted status when the printer driver displays a setting screen.

(Outline of Setting Screen of Printer Driver)

When carrying out setting modification of the PC side print setting 14A in the PC 1, the printer driver is started. And, such a setting screen 41 as shown in FIG. 5 is displayed in the display 16 by the function of the printer driver.

An object 43 showing that the printer 2 is in a function-restricted status is displayed in a specified area in the setting screen 41. The object 43 is displayed based on the printer side print setting 24A acquired from the printer 2 side.

Figure 5:
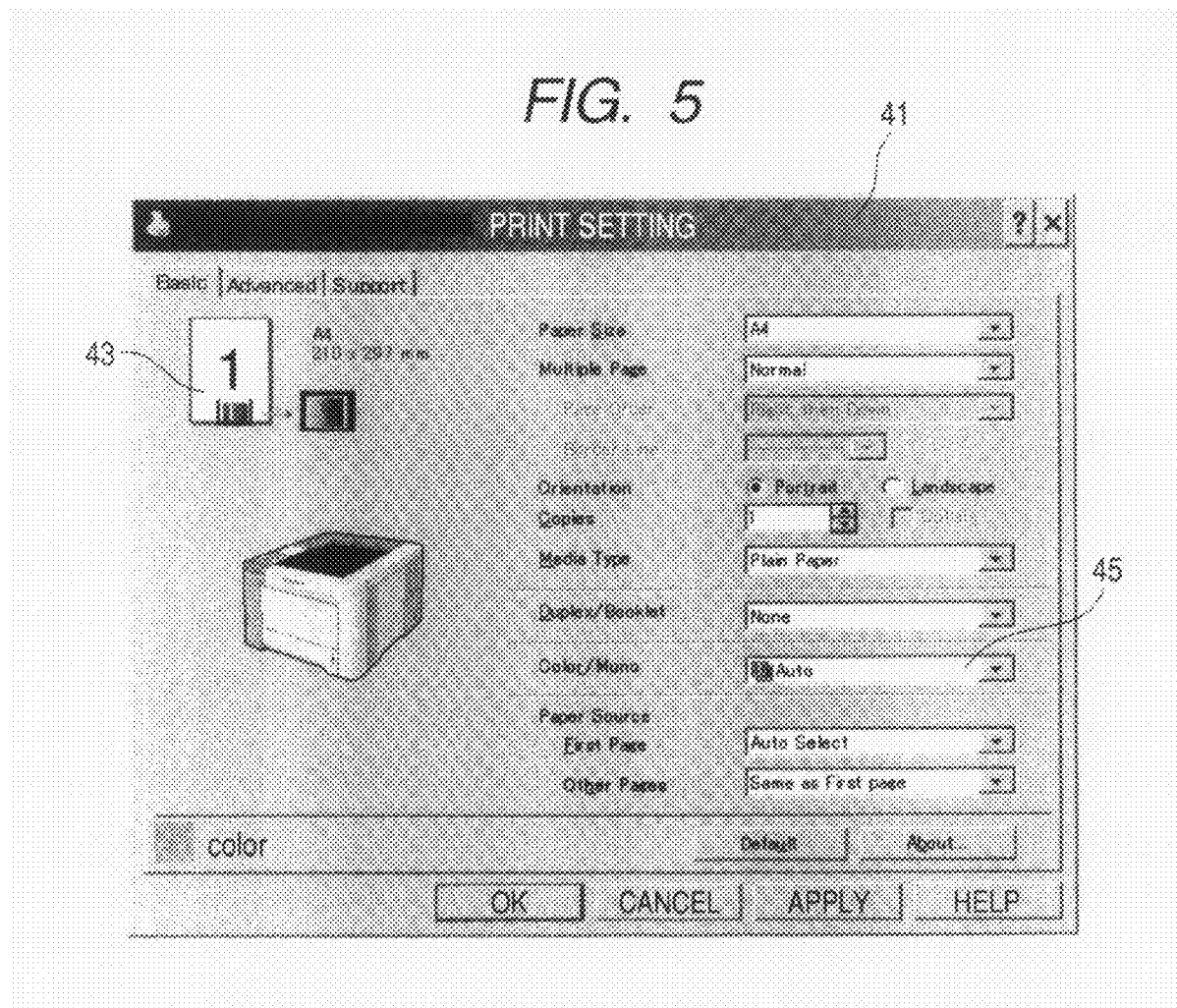
FIG. 5 is a schematic view showing a printer driver setting screen in Embodiment 2.

In the case of the object 43 shown in FIG. 5, it is displayed that the full-color printing function of the printer 2 is restricted by the printer side print setting 24A, and even if a full-color print command is given to the printer 2, monochrome printing is executed in the printer 2.

A pull-down menu 45 regarding the full-color print setting is disposed in the setting screen 41, and it is possible to select, by using the pull-down menu 45, which print is commanded, full-color printing or monochrome printing. The default setting that is initially displayed here is displayed based on the PC side print setting 14A.

Where the full-color printing function of the printer 2 is not restricted, selection by the pull-down menu 45 is made valid, wherein if full-color printing is commanded, the printer 2 carries out full-color printing, and if monochrome printing is commanded, the printer 2 carries out monochrome printing.

On the other hand, even in a case where the printer 2 is restricted in regard to the full-color printing function, selection operation using the pull-down menu 45 is possible, and the PC 1 transmits a full-color print command or a monochrome print command to the printer 2 based on the selection operation. Even if either of full-color print command or monochrome print command is transmitted to the printer 2, the printer 2 is permitted to carry out monochrome printing since the printer 2 is restricted in regard to the full-color printing function.

That is, even if selection operation is enabled by the pull-down menu 45, the selection becomes substantially invalid. The object 43 shows that the selection by the pull-down menu 45 becomes substantially invalid.

Therefore, if a user checked the object 45, the user may know that full-color printing is not actually possible even if the PC side print setting 14A is modified to full-color printing by a selection operation at the pull-down menu 45, at the moment when the user carries out setting modification of the PC side print setting 14A.

(Process on Starting Printer Driver Setting Screen)

Figure 6:
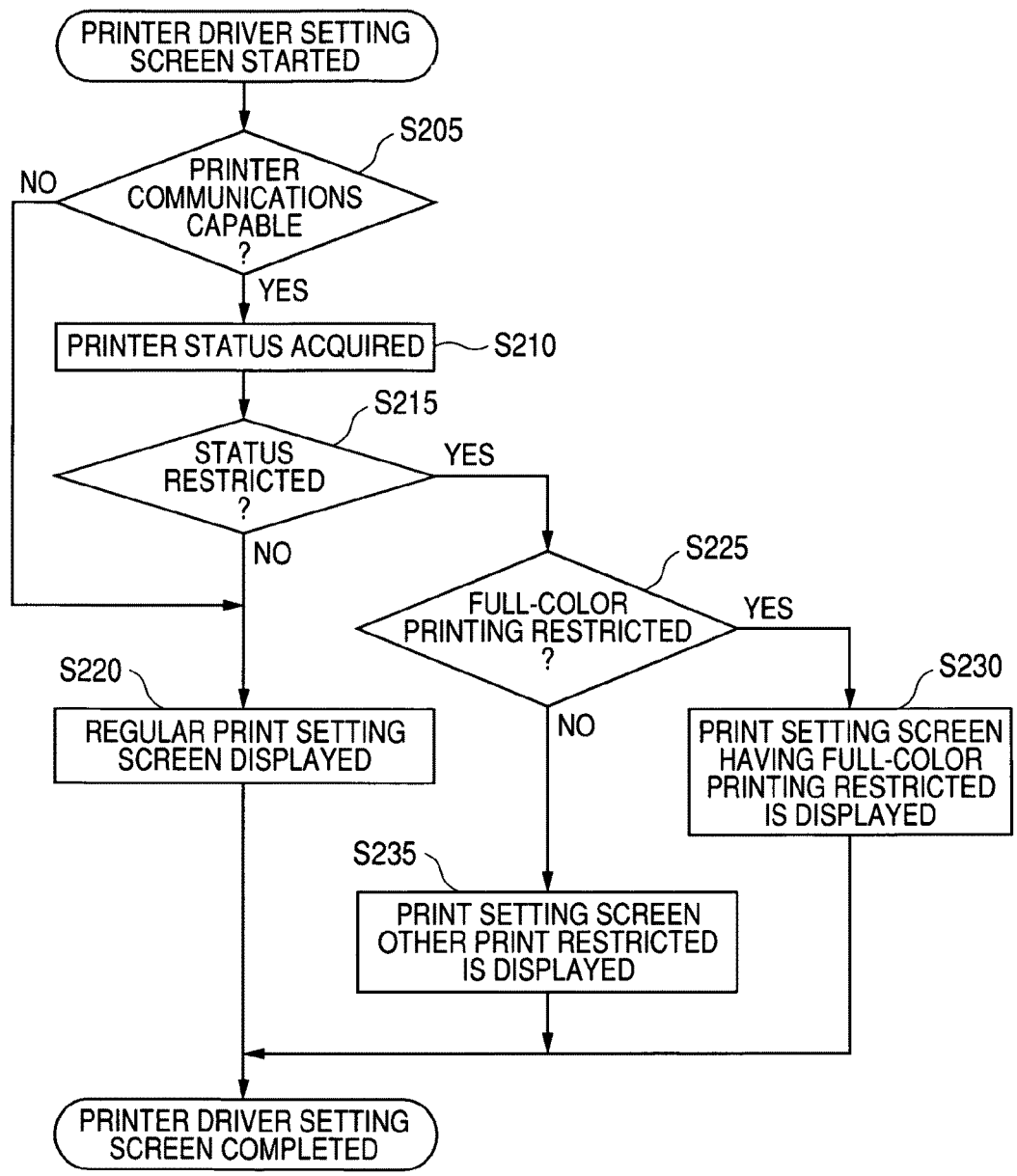
FIG. 6 is a flowchart of a process executed in the PC when starting of the printer driver setting screen is commanded in Embodiment 2.

Next, a description is given of the process executed in the PC 1 when starting of the printer driver setting screen is instructed, based on a flowchart of FIG. 6.

As the process is commenced, the PC 1 first judges whether the PC 1 is able to communicate with the printer 2 (S205). Here, in the process of S205, if the PC 1 is able to communicate with the printer 2 (S205: YES), the PC 1 acquires a printer status from the printer 2 (S210). And the PC 1 judges whether the acquired status is restricted (S215).

Where the status is not restricted in the process of S215 (S215: NO), the PC 1 displays a regular print setting screen (S220). Also, in the process of S205, even if the PC 1 is not able to communicate with the printer 2 (S205: NO), the regular print setting screen is displayed (S220).

By the process of S220, "Regular print setting screen" that will be displayed in the display 16 of the PC 1 is turned into a display pattern, in which the object 43 is deleted, of the setting screen 41 shown in FIG. 5.

That is, in the setting screen 41 shown in FIG. 5, displaying the object 43 shows that full-color printing of the printer 2 is restricted. On the contrary, the case where the process of S220 is executed is either of the cases where the full-color printing function of the printer 2 is not restricted (=S215: NO) or where it is not clear whether the full-color printing function of the printer 2 is restricted (=S205: NO).

Accordingly, in the process of S220, a display pattern in which the object 43 is deleted from the setting screen 41 shown in FIG. 5 is brought about. Also, after the process of S220 is completed, the present process is terminated.

On the other hand, where the status is restricted in the process of S215 described above (S215: YES), the PC 1 judges whether full-color printing is restricted (S225). Where full-color printing is restricted (S222: YES), the PC 1 displays a print setting screen in which full-color printing is restricted.

By the process of S230, "print setting screen in which full-color printing is restricted" that will be displayed in the display 16 of the PC 1 is turned into a display pattern equivalent to the setting screen 41 itself shown in FIG. 5. Therefore, a user looks at the object 43 in the setting screen 41, and can know that the printer 2 is restricted in regard to full-color printing. Also, after the process of S230 is completed, the present process is terminated.

Further, in the process of S225, where full-color printing is not restricted (S225: NO), the PC 1 displays a print setting screen of the other print restriction (S235). By the process of S235, "print setting screen of the other print restriction" that will be displayed in the display 16 of the PC 1 is turned into a display pattern in which the object 43 existing in the setting screen 41 shown in FIG. 5 is changed to some other object. Also, "some other object" referred to here becomes an object showing a printing function of the printer 2, which is restricted by the printer side print setting 24A.

Also, in order to simplify the description, "the other print restriction" is named in the process of S235. However, if "the other print restriction" is in a plurality of types, judgment corresponding to the process S225 and process corresponding to the process of S230 are repeated in a plurality of stages in the process of S235.

A plurality of objects each corresponding to "the other print restriction" which is in a plurality of types are displayed one by one in the setting screen 41, and it is possible to notify each of "the other print restriction" which is in a plurality of types.

Effects of Embodiment 2

As described above, according to the PC 1, a user of the PC 1 may recognize whether the printer 2 is restricted or not resulting from the printer side print setting 24A, based on the object 43 outputted and displayed when attempting to carry out setting modification in regard to the PC side print setting 14A.

Therefore, when carrying out setting modification in regard to the PC side print setting 14A, it is possible to judge whether desired printing is enabled, without actually attempting to print, and it is possible to prevent a useless print setting from being carried out. Also, it is possible to prevent in advance that a user who cannot carry out a desired printing has doubts about whether there is something wrong with the PC side print setting 14A.

In addition, the object 43 is simultaneously outputted when the setting screen 41 is displayed, which includes a setting item (pull-down menu 45 for a full-color print setting) subjected to influence if the printer 2 is in the function-restricted status. Therefore, it is possible to accurately judge whether desired printing is enabled, only by setting modification by the pull-down menu 45.

(3) Embodiment 3

Next, a description is given of Embodiment 3.

In Embodiment 2 described above, an example in which setting modification itself is enabled by the pull-down menu 45 even if the printer 2 is in the function-restricted status. However, in Embodiment 3, a description is given of an example in which setting modification itself based on the pull-down menu 45 is prohibited.

(Outline of Printer Driver Setting Screen)

Figure 7:
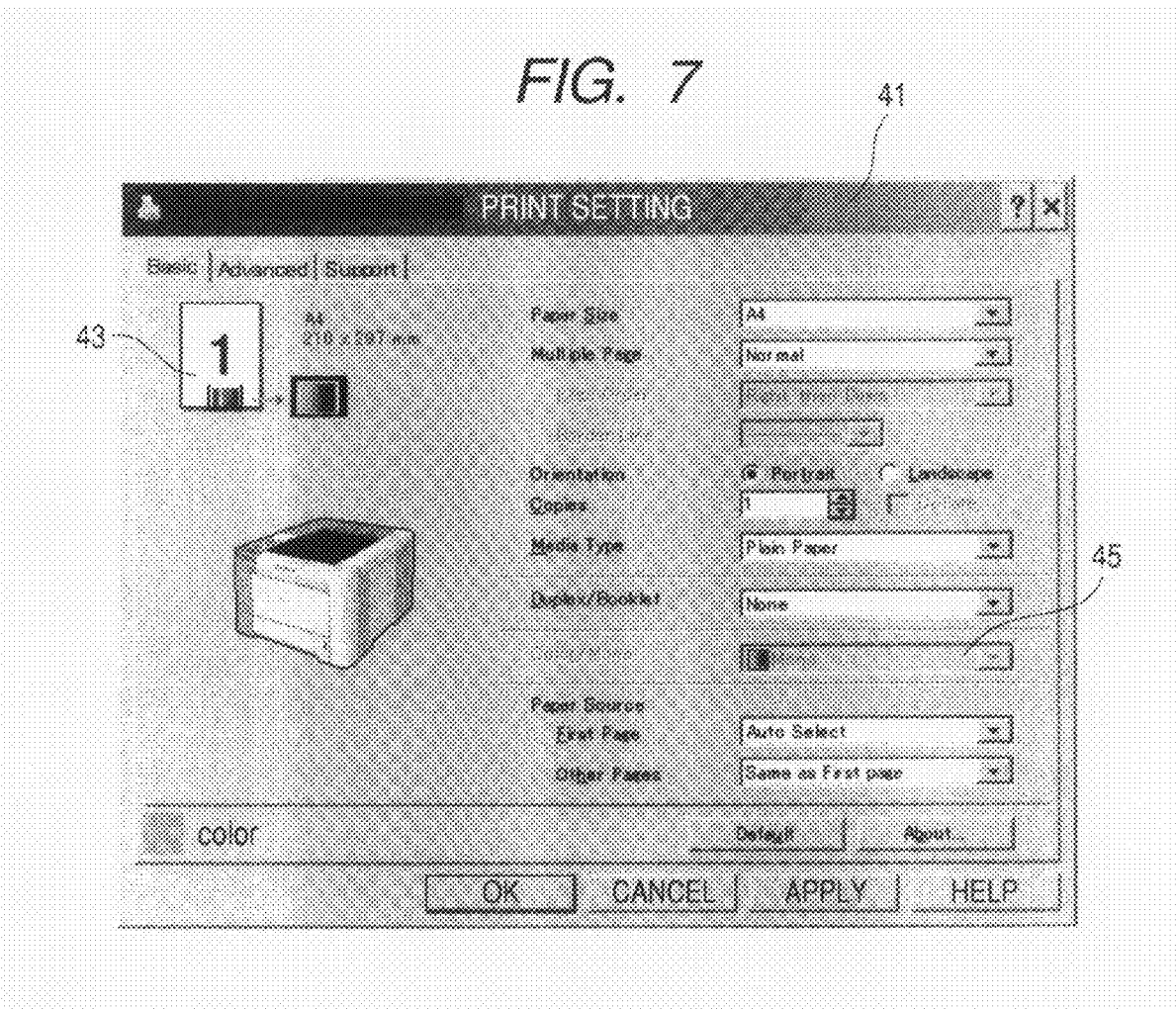
FIG. 7 is a schematic view showing the printer driver setting screen in Embodiment 3.

In the case of Embodiment 3, in the PC 1, the printer driver is started when executing setting modification of the PC side print setting 14A. And, such a setting screen 41 as shown in FIG. 7 is displayed in the display 16 by the function of the printer driver.

Also, in the setting screen 41, an object 43 showing that the printer 2 is in the function-restricted status is displayed. The object 43 is displayed based on the printer side print setting 24A acquired from the printer 2 side.

In addition, a pull-down menu 45 regarding full-color print setting is displayed in the setting screen 41. However, in Embodiment 3, use of the pull-down menu 45 is prohibited. Also, it is judged based on the printer side print setting 24A whether use of the pull-down menu 45 is prohibited.

Setting initially displayed in the pull-down menu 45 is not displayed based on the PC side print setting 14A in the case of Embodiment 3, but the setting contents in compliance with the printer side print setting 24A is displayed.

A description is given, using a specific example. In a case where the full-color printing function of the printer 2 is restricted, only monochrome printing is available. Therefore, the initially displayed contents of the pull-down menu 45 is brought in a status where monochrome printing is selected, wherein it is not possible to modify the initially displayed contents.

Therefore, if a user looks at the object 43 and the pull-down menu 45, the user can know that selection operation of the pull-down menu 45 is made invalid and no full-color printing is available, at the moment when the user executes setting modification of the PC side print setting 14A.

(Process in Starting Printer Driver Setting Screen)

Figure 8:
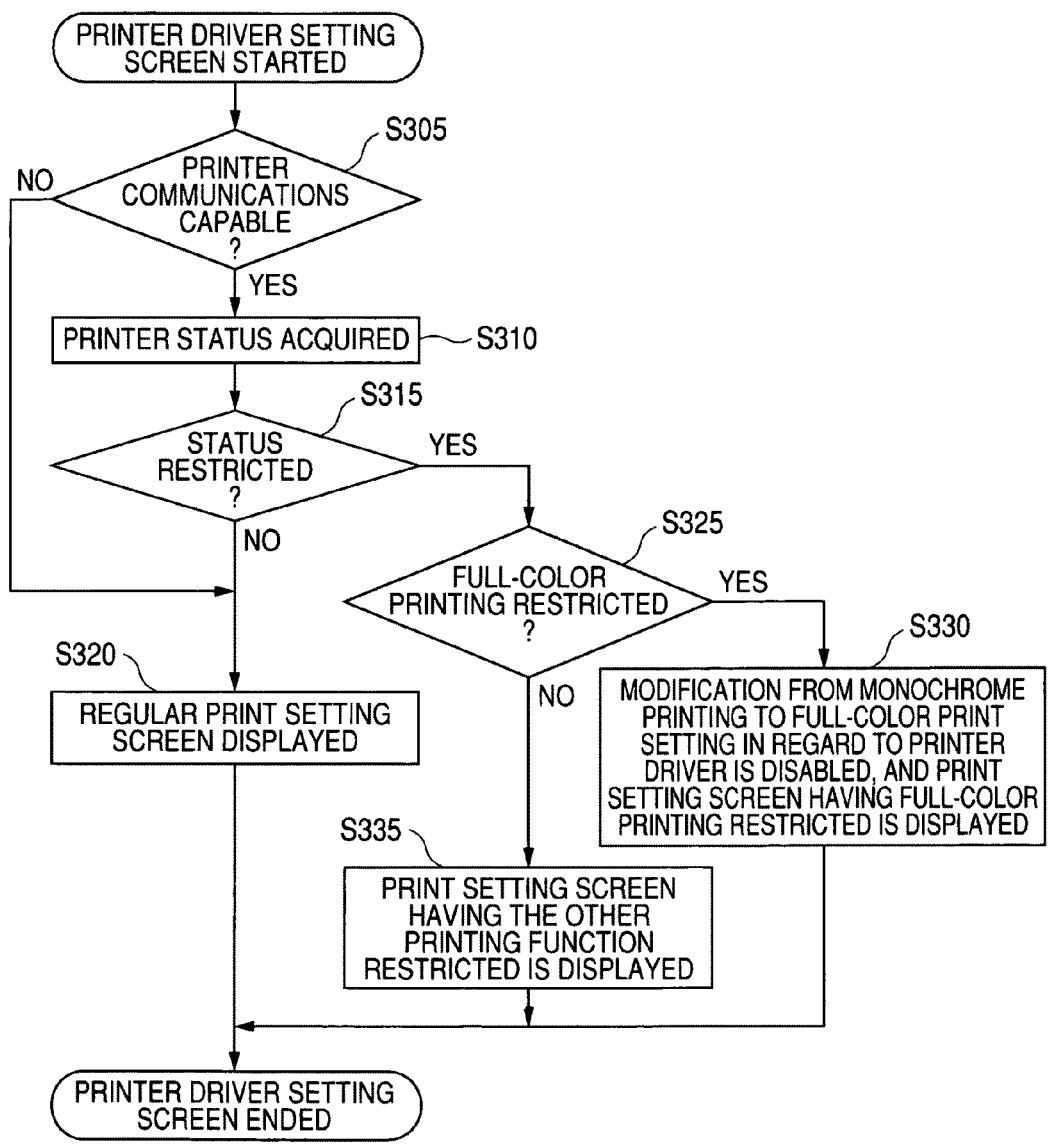
FIG. 8 is a flowchart of a process executed in the PC when starting of the printer driver setting screen is commanded in Embodiment 3.

Next, a description is given of a process executed in the PC 1 when starting of the printer driver setting screen is commanded, based on a flowchart of FIG. 8.

As the process is commenced, the PC 1 first judges whether the PC 1 is able to communicate the printer 2 (S305). Here in the process of S305, if the PC 1 is able to communicate with the printer 2 (S305: YES), the PC 1 acquires a printer status (S310), and judges whether the acquired status is being restricted (S315).

Where the status is not restricted in the process of S315 (S315: NO), the PC 1 displays a regular print setting screen (S320). Also, where the PC 1 is not be able to communicate with the printer 2 in the process of S305 (S305: NO), a regular print setting screen is displayed (S320).

"Regular print setting screen" that will be displayed in the display 16 of the PC 1 by the process of S320 is turned into a display pattern in which the object 43 is deleted in the setting screen 41 shown in FIG. 7. The point is the same as in Embodiment 1. Also, after the process of S320 is completed, the process is terminated.

On the other hand, where the status is being restricted in the process of S315 described above (S315: YES), the PC 1 judges whether full-color printing is restricted (S325). Where full-color printing is restricted (S325: YES), the PC 1 disables modification from monochrome printing to full-color print setting in regard to the printer driver, and displays the print setting screen in which full-color printing is being restricted (S330).

"Print setting screen in which full-color printing is restricted" which is displayed in the display 16 of the PC 1 is brought into a display pattern equivalent to the setting screen 41 shown in FIG. 7. That is, the setting screen 41 in which the pull-down menu 45 cannot be modified from monochrome printing is displayed.

Therefore, when a user looks at the object 43 and the pull-down menu 45 which are provided in the setting screen 41, the user can know that the printer 2 is being restricted in regard to full-color printing. Also, after the process of S330 is completed, the present process is terminated.

Further, where full-color printing is not being restricted in the process of S325 described above (S325: NO), the PC 1 displays the print setting screen in which the other printing function is restricted (S335). "Print setting screen in which the other printing function is restricted" that will be displayed in the display 16 of the PC 1 is turned into a display pattern in which the object 43 existing in the setting screen 41 shown in FIG. 7 is modified to some other object.

Also, the process of S335 may be made equivalent to the process of S235 in Embodiment 2 described above. At this time, setting items corresponding to functions to be restricted may be made invalid as in the case of the pull-down menu 45 in the process of S330 described above.

Effects of Embodiment 3

As described above, according to the PC 1, a user of the PC 1 can recognize whether the printer 2 is in the function-restricted status resulting from the printer side print setting 24A, based on the object 43 displayed and outputted when attempting to modify the setting in regard to the PC side print setting 14A.

Therefore, when carrying out setting modification in regard to the PC side print setting 14A, it is possible to judge whether desired printing is enabled, without actually attempting to print, and it is possible to prevent a useless print setting from being carried out. Also, it is possible to prevent in advance that a user who cannot carry out a desired printing has doubts about whether there is something wrong with the PC side print setting 14A.

Also, when the setting screen 41 is displayed which includes a setting item (pull-down menu 45 for a full-color print setting) subjected to influence if the printer 2 is in a function-restricted status, the object 43 is simultaneously outputted. Furthermore, it is not in a status where the setting cannot be modified by the pull-down menu 45.

Accordingly, it is possible to prevent the setting items included in the PC side print setting 14A from being modified regardless of the printer being in the function-restricted status resulting from the printer side print setting 24A. Also, since the setting items included in the PC side print setting 14A cannot be modified, the user can know that the printer 2 is in a function-restricted status.

(4) Modified Version, etc

Although a description was given of embodiments as described above, the present invention is not limited to the detailed embodiments described above. The invention may be embodied in various modes other than the above.

For example, in the above-described embodiments, examples are shown in which the object 43 by which specific contents of a function restriction can be understood is displayed in the setting screen 41. However, an object may be shown by which it is possible to understand only that the printer 2 side is restricted in regard to the functions and by which the specific contents of the function restriction are not understand able.

Figure 9A:
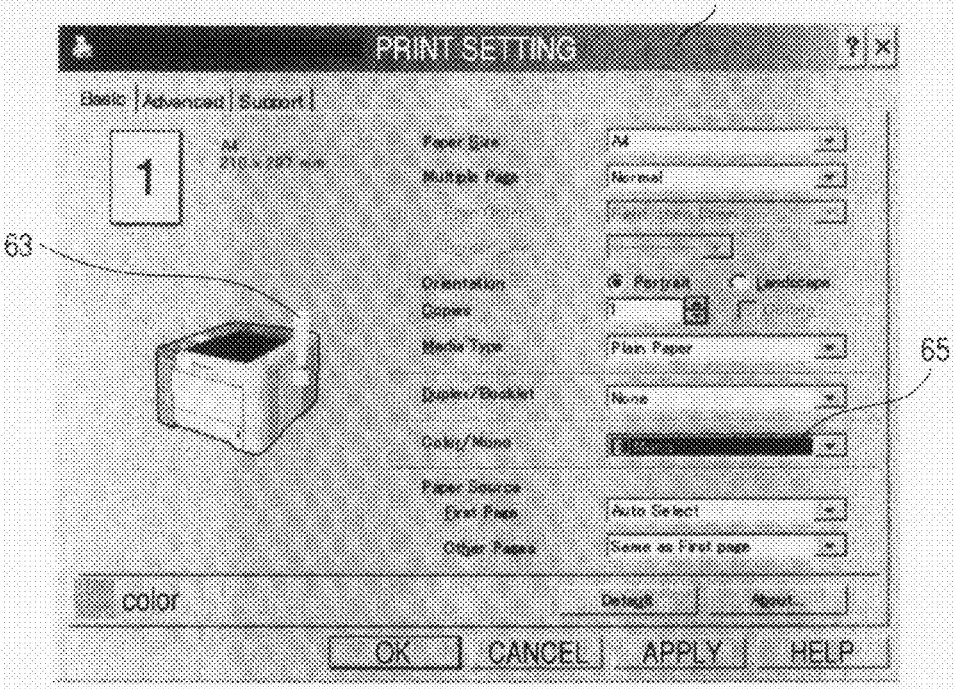
FIGS. 9A and 9B are schematic views showing the printer driver setting screen illustrated as a modified version.

In further detail, by displaying an object 63 expressing "!" as in the setting screen 61 illustrated in FIG. 9A, it may be notified that the printer 2 side is subjected to a specified function restriction. However, with only such object 63, a user cannot understand which function restriction is adopted.

Therefore, in this case, for example, it is favorable that the setting items included in the PC side print setting 14A, which will be restricted subject to the function restriction in the printer side print setting 24A are reversed and displayed as in the pull-down menu 65 illustrated in FIG. 9A. If so, a user is able to understand which function restriction is adopted, based on the point other than the object 63.

Figure 9B:
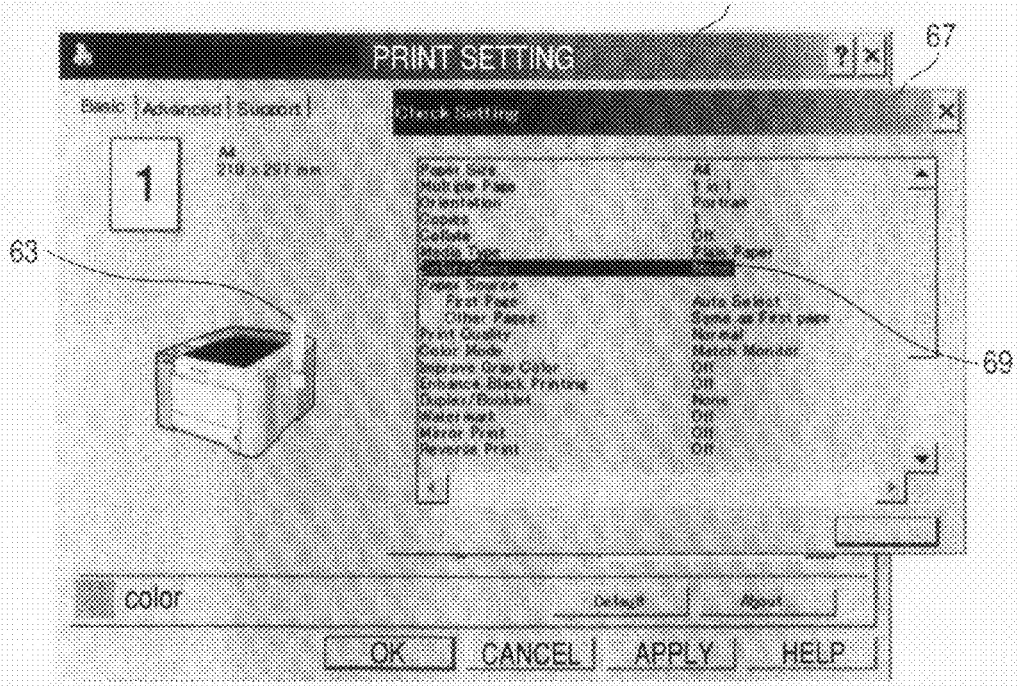

Or, it is configured that, if a predetermined operation (for example, "click operation," etc.) for the object 63 is carried out, another window 67 is opened as shown in FIG. 9B, and detailed information of setting items 69 subjected to influence by the function restriction may be displayed in another window 67.

Also, although not clearly referred to in the present embodiments described above, the configuration of Embodiments 2 and 3 are particularly effective in the case where work for modifying the default print setting of the printer driver is carried out.

That is, usually, the default print setting of the printer driver is just the PC side print setting 14A stored in the HDD 14. However, when modifying the setting, it cannot be said that printing is necessarily executed instantaneously. For example, there may be many cases where only setting modification is executed for printing later on.

In such circumstances, as a matter of course, there may be cases where a recording medium for trial printing is not set in the printer 2, and there is a possibility that a user executes setting modification without commanding printing. At this time, if the user modifies the setting contents of the PC side print setting 14A to the setting that utilizes a restricted function without noticing the function restriction at the printer 2 side, the user will later on be aware that a useless setting has been modified.

Therefore, in such a case, it can be said that the configuration according to Embodiments 2 and 3 is effective in which a user can notice a function restriction at the printer 2 side only by carrying out setting modification without actually commanding printing.

In addition, in the above-described embodiments, examples of displaying and outputting by icon 33, object 43 and object 63, etc. are shown. However, information may be outputted by a method other than displaying. If specific examples are mentioned, for example, it is possible to notify it by unit of sound output (synthetic sound, chime, buzzer, etc.) that the printer 2 is subjected to function restriction.

A printer that is an object of the present invention is "the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side." Such a printer may be understood as the following configuration.

That is, the printer can be understood as "a printer in which utilization of a predetermined function equipped by the printer is set in the first print setting existing in the information processing apparatus side, and utilization of the predetermined function is restricted where setting is made in the second print setting existing in the printer side so that utilization of the predetermined function is restricted even in a case where the status of the printer is a status where the predetermined function can be utilized."

Here, "the status of the printer is a status where the predetermined function can be utilized" means, as referred to in Embodiment 1 described above, that "the status of the printer is not in a status where the printer is not short of ink, not short of sheets, is not in a print busy status, or is not short of memory." In other words, it means that "the printer can be utilized in the first print setting unless a function restriction is given, and a predetermined function the execution of which is instructed can be utilized without any problem."

An information processing apparatus according to one of the aspects of the embodiments is characterized in that the receiving unit and the controller are units that are able to start and end independently from a print instruction system process for instructing printing to the printer in compliance with the first print setting, and that is composed by functioning of a residing process which, after being started, resides in the information processing apparatus and continues processing.

According to the information processing apparatus thus configured, a residing process can be started independently from a print instruction system process while the print instruction system process is started when a user of the information processing apparatus executes printing by the printer. Therefore, if the residing process is started as necessary, the user can judge in advance whether desired printing is enabled, without starting the print instruction system process.

In addition, the information processing apparatus according to one of the aspects of the embodiments is characterized in that the residing process is a process for causing a status monitor, which always outputs the status of the printer, to function in the information processing apparatus, and the status monitor always outputs, as the output information, at least one selected from a normal status in which normal printing is available, an error status in which no printing is available, and a plurality of statuses including at least the function-restricted status via the output unit.

Inherently, the status monitor does not always output the setting contents that are optionally set at the printer side but does always output what the status of the printer, which dynamically changes, is.

On the contrary, a status monitor functioning in the information processing apparatus according to the one of the aspects of the embodiments outputs the setting contents regarding the functions optionally set at the printer side in addition to the status of the printer which may be subjected to a dynamic change. That is, in the above-described status monitor, "Setting contents regarding the function restriction" is handled as a type of "Status of printer" and is an object that is always outputted.

According to the information processing apparatus thus configured, if a user checks based on the output of the status monitor whether the status of the printer is normal or erroneous, the user can know, when checking, that the printer is in a function-restricted status.

Further, the information processing apparatus according to one of the aspects of the embodiments is characterized in that the output unit is an unit for displaying the output information, and the controller executes control to display, via the display unit, a display object with which it is distinguishable by a user on the basis of a difference in pattern or color whether the printer is in the function-restricted status.

According to the information processing apparatus thus configured, a user can intuitively distinguish at a glance whether the printer is in a function-restricted status based on a difference in pattern or color of a display object displayed via display unit.

Also, the information processing apparatus according to one of the aspects of the embodiments is characterized in that the controller executes control to display information, which shows the details of the function-restricted status, via the display unit in compliance with instructions given by a user.

According to the information processing apparatus thus configured, a user who needs the details of the function-restricted status may know detailed information only by giving an instruction. On the other hand, if a user who does not need the details of the function-restricted status does not give any instruction, troublesome information is not displayed. Therefore, information the details of which are in compliance with the degree of necessity given by the user may be provided.

Further, the information processing apparatus according to one of the aspects of the embodiments is characterized in that the controller executes control to display, via the display unit, information showing the details of the function-restricted status under either condition that a user has pointed to, using a pointing device, the display object expressing that the printer is in the function-restricted status, or a user has carried out a predetermined operation by the pointing device after the corresponding point is completed.

According to the information processing apparatus thus configured, a user who needs the details of the function-restricted status may know the detailed information only by pointing to a display object using a pointing device or carrying out a predetermined operation by the pointing device after the pointing is completed. Therefore, the user may know the detailed information by a remarkably simple operation.

Next, the information processing apparatus according to one of the aspects of the embodiments is characterized in that it includes: an output unit for outputting output information to a user; a receiving unit for receiving function-restricting information showing whether a printer is in a function-restricted status, from the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side; and a controller for executing control to output, via the output unit, the output information showing whether the printer is in the function-restricted status, based on the function-restricted information received by the receiving unit under the condition that a setting modification process in regard to the first print setting becomes necessary in compliance with an instruction from a user.

According to the information processing apparatus thus configured, a user of the information processing apparatus may recognize in advance whether the printer is in a function-restricted status resulting from the second print setting, based on output information outputted when the user attempts to modify the first print setting.

Therefore, when carrying out print setting with respect to the first print setting, it is possible to judge whether desired printing is enabled, without actually printing, wherein it is possible to prevent that unnecessary setting modification is carried out. In addition, it is possible to prevent in advance that a user who cannot carry out a desired printing has doubts about whether there is something wrong with the first print setting.

Also, the information processing apparatus according to one of the aspects of the embodiments is characterized in that the controller is able to display a setting modification screen including at least setting items subjected to influence where the printer is in the function-restricted status in the first print setting and executes control to output, via the output unit, the output information showing whether the printer is in the function-restricted status when displaying at least the corresponding setting modification screen.

According to the information processing apparatus thus configured, when a setting modification screen is displaced which is to carry out setting modification of the setting items (for example, color print setting) subjected to influence if the printer is in a function-restricted status, output information is simultaneously outputted which shows whether the printer is in a function-restricted status. Therefore, it is possible to judge whether desired printing is possible only by setting modification of the items included in the first print setting.

In addition, the information processing apparatus according to one of the aspects of the embodiments is characterized in that the controller is able to display a setting modification screen including at least setting items subjected to influence where the printer is in the function-restricted status in the first print setting, and when displaying at least the corresponding setting modification screen, while the controller displays the setting items, which are in a status where setting modification cannot be accepted, as the output information showing whether the printer is in the function-restricted status if the printer is in the function-restricted status, and the controller executes control to display the setting items subjected to setting modification as the output information showing whether the printer is in the function-restricted status if the printer is not in the function-restricted status.

According to the information processing apparatus thus configured, when a setting modification screen is displayed which carries out setting modification of setting items subjected to influence if the printer is in a function-restricted status, it is variable whether modification of the setting items is possible, in compliance with whether the printer is in a function-restricted status.

Therefore, it is possible to prevent the setting items included in the first print setting from being modified regardless of the printer being in a function-restricted status. Also, a user can detect it based on the setting modification being impossible that the printer is in a function-restricted status.

Next, a program according to one of the aspects of the embodiments is characterized in causing an information processing apparatus, which is provided with an output unit for outputting output information to a user, to function as a receiving unit for receiving function-restricting information showing whether a printer is in a function-restricted status, from the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side; and a controller for executing control so as to always output via the output unit the output information showing whether the printer is in the function-restricted status, based on the function restricting information received by the receiving unit.

According to the program thus configured, the information processing apparatus is caused to function as the respective unit described in the first aspect. In this case, the information processing apparatus may bring about actions and effects as described in regard to the information processing apparatus according to the first aspect.

Also, the program according to one of the aspects of the embodiments may be configured as a program to cause the information processing apparatus to function as the respective unit equipped in the information processing apparatus described above. In this case, the information processing apparatus may bring about actions and effects as described in regard to the information processing apparatus.

Next, the program according to one of the aspects of the embodiments is characterized in causing an information processing apparatus, which is provided with an output unit for outputting output information to a user, to function as a receiving unit for receiving function-restricting information showing whether a printer is in a function-restricted status, from the printer in which utilization of a predetermined function is restricted where it is set that utilization of the predetermined function is restricted in the second print setting existing in the printer side even where it is set that the predetermined function equipped by the printer is utilized in the first print setting existing in the information processing apparatus side; and a controller for executing control to output, via the output unit, the output information showing whether the printer is in the function-restricted status, based on the function-restricted information received by the receiving unit under the condition that a setting modification process in regard to the first print setting becomes necessary in compliance with an instruction from a user.

According to the program thus configured, the information processing apparatus is caused to function as the respective unit described above. In this case, the information processing apparatus may bring about actions and effects as described in regard to the information processing apparatus.

Also, the program described above may be configured as a program for causing the information processing apparatus to function as the respective unit equipped by the information processing apparatus according to the above aspects. In this case, the information processing apparatus may bring about actions and effects as described in regard to the information processing apparatus described above.

What is claimed is:

1. An information processing apparatus, comprising:
   a display configured to display output information;
   a receiver configured to receive function-restricting information showing whether a printer is in a function-restricted status, from the printer in which utilization of a predetermined function is restricted when it is set that utilization of the predetermined function is restricted in the second print setting existing in the printer side even when it is set that the predetermined function equipped by the printer is utilized in the first print setting existing in the information processing apparatus side; and a controller configured to control the display to display the output information showing whether the printer is in the function-restricted status, based on the function restricting information received by the receiver, wherein:

the controller is configured to control the display to display a display object with which it is distinguishable whether the printer is in the function-restricted status, the controller is configured to control the display to display information, which shows the details of the function-restricted status, in compliance with input instructions, and the controller is configured to control the display to display information showing the details of the function-restricted status under a condition that a pointer is used to point to a display object, which indicates that the printer is in the function-restricted status.

2. The information processing apparatus according to claim 1, wherein each of the receiver and the controller is configured to start and end independently from a print instruction system process for instructing printing to the printer in compliance with the first print setting, the receiver and the controller are controlled by functioning of a residing process which, after being started, resides in the information processing apparatus and continues processing.

3. The information processing apparatus according to claim 2, wherein:

the residing process is a process for causing a status monitor, which is configured to output the status of the printer, to function in the information processing apparatus, and the status monitor is configured to output, as the output information, at least one selected from a normal status in which normal printing is available, an error status in which no printing is available, and a plurality of statuses comprising at least the function-restricted status via the display.

4. The information processing apparatus according to claim 1, wherein the controller is configured to control the display to display the display object with which it is distinguishable on the basis of a difference in pattern or color whether the printer is in the function-restricted status.

5. The information processing apparatus according to claim 1, wherein the controller is configured to control the display to display information showing the details of the function-restricted status under a condition that the pointer is used to point to the display object, which indicates that the printer is in the function-restricted status, and a predetermined operation has been carried out using the pointer after the pointing process of pointing to the display object is completed.

6. An information processing apparatus, comprising:

an output device configured to output information;

a receiver configured to receive function-restricting information showing whether a printer is in a function-restricted status, from the printer in which utilization of a predetermined function is restricted when it is set that utilization of the predetermined function is restricted in the second print setting existing in the printer side even when it is set that the predetermined function equipped by the printer is utilized in the first print setting existing in the information processing apparatus side; and a controller configured to control the output device to output the output information showing whether the printer is in the function-restricted status, based on the function-restricted information received by the receiver under a condition that a setting modification process in regard to the first print setting becomes necessary in compliance with an input instruction, wherein:

the controller is configured to control the information processing apparatus to display a setting modification screen comprising at least setting items subjected to influence when the printer is in the function-restricted status in the first print setting, the controller is configured to control the output device to output the output information showing whether the printer is in the function-restricted status when displaying at least the setting modification screen, when displaying at least the setting modification screen, when the printer is in the function-restricted status, the controller is configured to control the information processing apparatus to display the setting items, which are in a status in which setting modification cannot be accepted, as the output information showing whether the printer is in the function-restricted status, and when displaying at least the setting modification screen, when the printer is not in the function-restricted status, the controller is configured to control the information processing apparatus to display the setting items, which are in a status in which setting modification can be accepted, as the output information showing whether the printer is in the function-restricted status.

7. A non-transitory, computer-readable medium having a computer program stored thereon and readable by an information processing apparatus, said computer program, when executed by the information processing apparatus, causes the information processing apparatus to perform operations comprising:

receiving function-restricting information showing whether a printer is in a function-restricted status, from a printer in which utilization of a predetermined function is restricted when it is set that utilization of the predetermined function is restricted in the second print setting existing in the printer side even when it is set that the predetermined function equipped by the printer is utilized in the first print setting existing in the information processing apparatus side;

controlling the information processing apparatus to display, via a display, output information showing whether the printer is in the function-restricted status, based on the function restricting information received by a receiver;

displaying, via the display, a display object with which it is distinguishable whether the printer is in the function-restricted status;

displaying information, which shows the details of the function-restricted status, via the display, in compliance with input instructions, and displaying, via the display, information showing the details of the function-restricted status under a condition that a pointer is used to point to a display object, which indicates that the printer is in the function-restricted status.

8. A non-transitory, computer-readable medium having a computer program stored thereon and readable by an information processing apparatus, said computer program, when executed by the information processing apparatus, causes the information processing apparatus to perform operations comprising:

receiving function-restricting information showing whether a printer is in a function-restricted status, from a printer in which utilization of a predetermined function is restricted when it is set that utilization of the predetermined function is restricted in the second print setting existing in the printer side even when it is set that the predetermined function equipped by the printer is utilized in the first print setting existing in the information processing apparatus side;

controlling the information processing apparatus so as to output, via an output device, output information showing whether the printer is in the function-restricted status, based on the function-restricted information received by a receiver under a condition that a setting modification process in regard to the first print setting becomes necessary in compliance with an input instruction;

displaying a setting modification screen comprising at least setting items subjected to influence when the printer is in the function-restricted status in the first print setting;

outputting, via the output device, the output information showing whether the printer is in the function-restricted status when displaying at least the setting modification screen, wherein:

when displaying at least the setting modification screen, when the printer is in the function-restricted status, displaying the setting items, which are in a status in which setting modification cannot be accepted, as the output information showing whether the printer is in the function-restricted status, and when displaying at least the setting modification screen, when the printer is not in the function-restricted status, displaying the setting items, which are in a status in which setting modification can be accepted, as the output information showing whether the printer is in the function-restricted status.

* * * * *